(12) United States Patent
Oiwa et al.

(10) Patent No.: US 9,664,962 B2
(45) Date of Patent: *May 30, 2017

(54) LIQUID CRYSTAL DISPLAY DEVICE

(71) Applicant: Japan Display Inc., Tokyo (JP)

(72) Inventors: Mika Oiwa, Tokyo (JP); Shinichiro Oka, Tokyo (JP); Toshiharu Matsushima, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/932,173

(22) Filed: Nov. 4, 2015

(65) Prior Publication Data

US 2016/0054629 A1    Feb. 25, 2016

Related U.S. Application Data

(63) Continuation of application No. 14/260,413, filed on Apr. 24, 2014, now Pat. No. 9,207,503.

(30) Foreign Application Priority Data

Apr. 25, 2013    (JP) .................................. 2013-092506

(51) Int. Cl.
*G02F 1/1343* (2006.01)
*G02F 1/1337* (2006.01)
*G02F 1/1333* (2006.01)

(52) U.S. Cl.
CPC .. *G02F 1/134363* (2013.01); *G02F 1/133345* (2013.01); *G02F 1/133707* (2013.01); *G02F 1/133784* (2013.01); *G02F 2201/124* (2013.01)

(58) Field of Classification Search
CPC ... G02F 2001/134372; G02F 1/134363; G02F 1/13345; G02F 1/133707; G02F 1/133784
See application file for complete search history.

(56) References Cited

U.S. PATENT DOCUMENTS

| | | |
|---|---|---|
| 2007/0146591 A1 | 6/2007 | Kimura et al. |
| 2009/0059150 A1 | 3/2009 | Lee |
| 2012/0169982 A1 | 7/2012 | Chuang et al. |
| 2015/0160520 A1* | 6/2015 | Matsushima ..... G02F 1/134363 349/33 |

FOREIGN PATENT DOCUMENTS

| | | |
|---|---|---|
| JP | 2009-150945 A | 9/2009 |
| JP | 2010-019873 A | 1/2010 |

* cited by examiner

*Primary Examiner* — James Dudek
(74) *Attorney, Agent, or Firm* — Typha IP LLC

(57) ABSTRACT

A pixel electrode formed into a slit structure with striped electrodes opposed to each other for a zero rubbing angle can provide fast response since rotational directions of the liquid crystals become opposite at both sides of the slit in the striped electrodes. The electrode structure, however, poses a problem of low transmittance. Provided is a liquid crystal display device of IPS-Pro scheme including a pixel electrode with one pair of striped electrodes. The first striped electrode includes a short electrode section and long electrode sections, and the second striped electrode also includes a short electrode section and long electrode sections. The long electrode sections of the first striped electrode are disposed adjacently to those of the second striped electrode. Liquid crystals are aligned in a lengthwise direction of the striped electrodes.

15 Claims, 8 Drawing Sheets

US 9,664,962 B2

LIQUID CRYSTAL DISPLAY DEVICE

CROSS-REFERENCE TO RELATED APPLICATIONS

This application is a Continuation of U.S. patent application Ser. No. 14/260,413, filed on Apr. 24, 2014, which claims the priority from Japanese Patent Application No. 2013-92505 filed on Apr. 25, 2013 in the Japanese Patent Office, the entire contents of which are incorporated herein by reference.

BACKGROUND

The present disclosure relates to a liquid crystal display device, which can be applied to a fast-response liquid crystal display mode, for example.

Liquid crystal display devices are the displays of a non-light-emitting type that display images by controlling the amount of light transmitted from a light source. Liquid crystal displays (LCDs) feature thin-walled and lightweight properties and low power consumption. In-Plane Switching (IPS) is among the typical liquid crystal display schemes currently useable to attain a wide viewing angle. The IPS scheme is a liquid crystal driving scheme that rotates liquid crystal molecules in a planar direction via a horizontal (in-plane) electric field, thus rotates an effective optical axis within a plane, and controls transmittance of the light. Various methods have heretofore been proposed for applying the horizontal electric field. The most common method is by forming a pixel electrode and a common electrode on one substrate with a stripe electrode structure. The application of the horizontal electric field with the stripe electrode structure is accomplished by, for example, forming both of the pixel electrode and the common electrode into the stripe electrode structure, or forming only the pixel electrode into the stripe electrode structure and disposing the common electrode of a flat shape via an insulating layer. Among the methods for applying the electric field are, for example, IPS-Pro (Provectus), which is described in JP-A-2009-150945, and Fringe Field Switching (FFS), which is described in JP-A-2010-19873.

SUMMARY

The present inventors initially considered adopting a fast-response liquid crystal display mode in the IPS-Pro scheme. The inventors, however, found the following problem:

Forming a pixel electrode into a slit structure including striped electrodes opposed to each other for a zero rubbing angle enables fast response since rotational directions of the liquid crystals become opposite at both sides of the slit in the striped electrodes. The electrode structure, however, poses a problem of low transmittance.

Some of typical features and characteristics of the present disclosure are outlined below.

The pixel electrode of a liquid crystal display device includes one pair of striped electrodes. A first striped electrode includes a short electrode section and long electrode sections, and a second striped electrode also includes a short electrode section and long electrode sections. The long electrode sections of the first striped electrode is disposed adjacently to those of the second striped electrode. Liquid crystals are aligned in a lengthwise direction of the striped electrodes.

The liquid crystal display device has fast response characteristics, and yet it can raise transmittance.

DESCRIPTION OF THE PREFERRED EMBODIMENTS

Hereunder, an example and modifications of the present invention, and a comparative example will be described in detail, pursuant to the accompanying drawings. In all of the drawings illustrating the example, the modifications, and the comparative example, elements having the same function are each assigned the same reference number, and repeated description of these elements is omitted hereinafter.

While alignment of liquid crystals (initial alignment of the liquid crystals) is obtained by a rubbing method in the following description, photo-alignment or any other appropriate alignment method may be used instead.

Prior to the present disclosure, the present inventors initially considered adopting the fast-response liquid crystal display mode in the IPS-Pro scheme. The inventors, however, found a problem. The following describes the problem.

Figure 1:
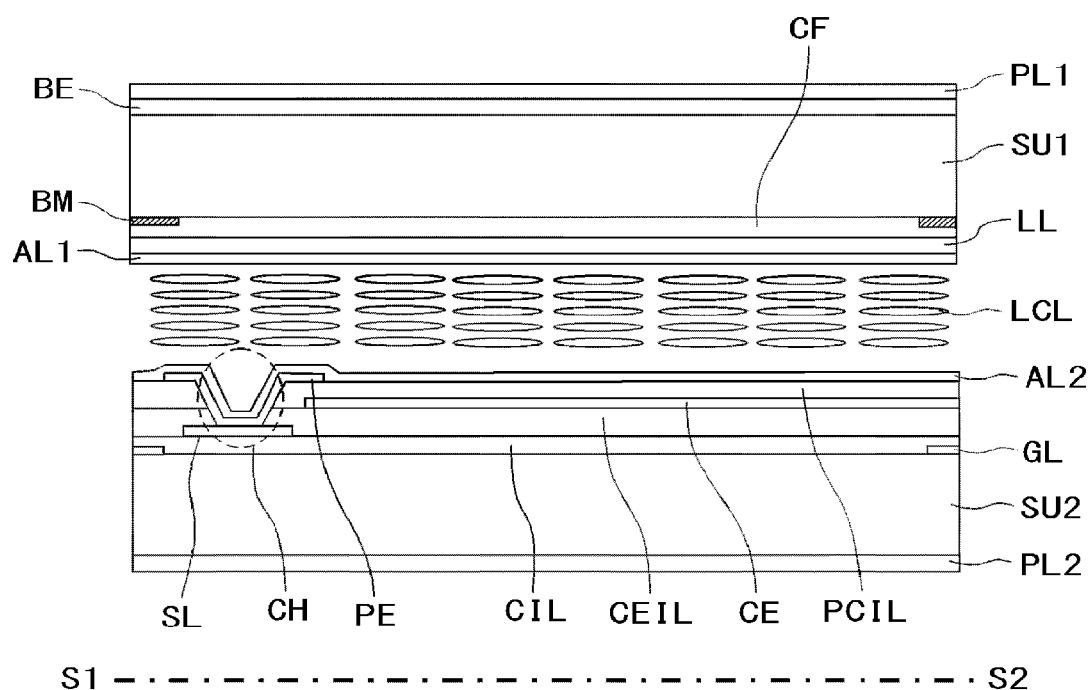
FIG. 1 is a sectional view of a general IPS-Pro structure in a liquid crystal display device.

First, a liquid crystal display device of a general IPS-Pro structure is described here. FIG. 1 shows schematically a section of one pixel in the liquid crystal display device of the general IPS-Pro structure. The liquid crystal display device is constituted mainly by a first substrate SU1, a second substrate SU2, and a liquid crystal layer LCL. The first substrate SU1 and the second substrate SU2 hold the liquid crystal layer LCL sandwiched between both. In order to stabilize an aligned state of the liquid crystal layer LCL, the first substrate SU1 and the second substrate SU2 include a first alignment film AL1 and a second alignment film AL2, respectively, on surfaces close to the liquid crystal layer LCL. Means for applying a voltage to the liquid crystal layer LCL is also present on a surface of the second substrate SU2 that is close to the liquid crystal layer LCL. A first polarizer PL1 is mounted above the first substrate SU1, and a second polarizer PL2 above the second substrate SU2.

The first substrate SU1 is a glass substrate. A first alignment film AL1, a leveling layer LL, a color filter CF, and a black matrix BM are stacked in that order between the first substrate SU1 and the liquid crystal layer LCL. The first alignment film AL1 is a polyimide-containing organic high-polymer film and is a horizontal alignment film. The leveling layer LL is an acrylic resin, excels in transparency, and has a function that levels out surface irregularities of an underlayer and prevents penetration of a solvent. The color filter CF has a flat structure with a repeated array of striped elements assuming red, green, and blue colors. The black matrix is formed from a resist including a black pigment, and has a planarly distributed structure of a grid-like shape, geared to identify pixel boundaries. In addition, a backside electrode BE for antistatic purposes is disposed on a side of the first substrate SU1 that is opposite to a side on which the liquid crystal layer LCL is disposed. The backside electrode BE is made from an indium-tin oxide (ITO) that exhibits a planar distribution of a flat form.

The second substrate SU2 is a glass substrate, as with the first substrate SU1. A second alignment film AL2, a pixel electrode PE, an interlayer insulating film PCIL, a common electrode CE, an active element (not shown), a gate line GL, and a source line SL are main elements provided between the second substrate SU2 and the liquid crystal layer LCL. The second alignment film AL2, as with the first alignment film AL1, is a horizontal alignment film formed from a polyimide-containing organic high-polymer film. The pixel electrode PE and the common electrode CE are both made from an ITO that excels in transparency and electric conduction properties. Both PE and CE are separated from each other by the interlayer insulating film PCIL made of silicon nitride (SiN). Whereas the pixel electrode PE is striped in flat shape, the common electrode CE has a contact hole CH, but is distributed over a substantially entire pixel surface. A gate line insulating film CIL is disposed on the gate line GL, the source line SL on the gate line insulating film CIL, and a common electrode insulating film CEIL on the gate line insulating film CIL and the source line SL.

Since the pixel electrode structure in FIG. 1 is most important in the present disclosure, only the pixel electrode PE, the interlayer insulating film PCIL, and the common electrode CE will be described hereinafter. The pixel electrode shape and liquid crystal alignment direction of the liquid crystal display device in the IPS-Pro structure (comparative example) whose adoption was considered prior to the present disclosure, and those of the liquid crystal display device of the example differ from the pixel electrode shape and liquid crystal alignment direction of the liquid crystal display device, shown in FIG. 1. In other structural aspects, however, the former two liquid crystal display devices are substantially the same as in FIG. 1. While FIG. 1 corresponds to an S1-S2 section in FIG. 2, the shape of the pixel electrode and the direction in which the liquid crystals are aligned differ from those of FIG. 2.

Figure 2:
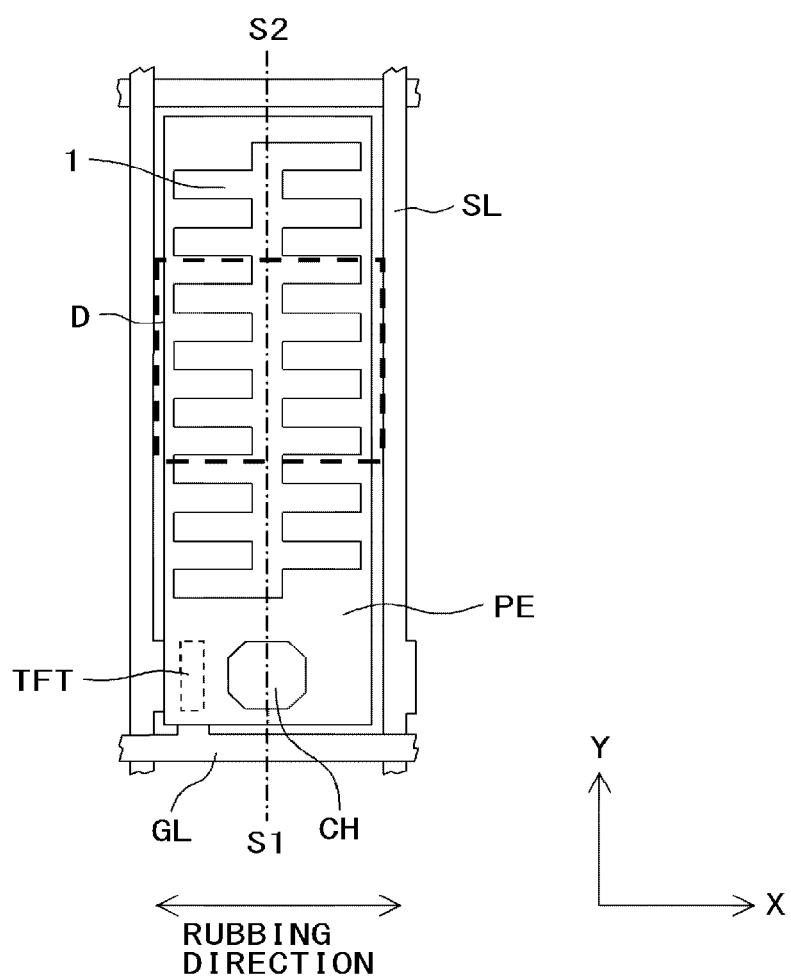
FIG. 2 is a plan view of a pixel structure of a liquid crystal display device according to a comparative example.

FIG. 2 is a plan view of a pixel structure of the liquid crystal display device according to the comparative example. As shown in FIG. 2, the pixel electrode PE is rectangular in flat shape and has a slit 1 and a contact hole CH. The pixel electrode PE constitutes one pair of striped electrode sections with the slit 1. The striped electrode sections of the pixel electrode PE are formed so that a lengthwise direction of each is parallel to an X-direction in which a gate line GL extends. In addition, the left-and-right pair of striped electrode sections are formed to be shifted in position from each other by substantially half a pitch in FIG. 2. The common electrode CE, which is present at a position lower than that of the pixel electrode PE, has a contact hole CH not shown, but is distributed over a substantially entire pixel surface. Outside the pixel electrode PE, a source line SL extends in a longitudinal direction (Y-direction) of the electrode PE. In addition, outside the pixel electrode PE, a gate line GL extends in a lateral direction (X-direction) of the electrode PE. A thin-film transistor TFT as an active element, is present at a position lower than that of the common electrode CE.

Figure 3A:
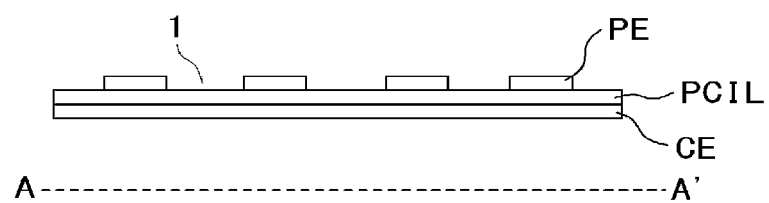
FIG. 3A is a sectional view of an electrode structure of the liquid crystal display device according to the comparative example.
Figure 3B:
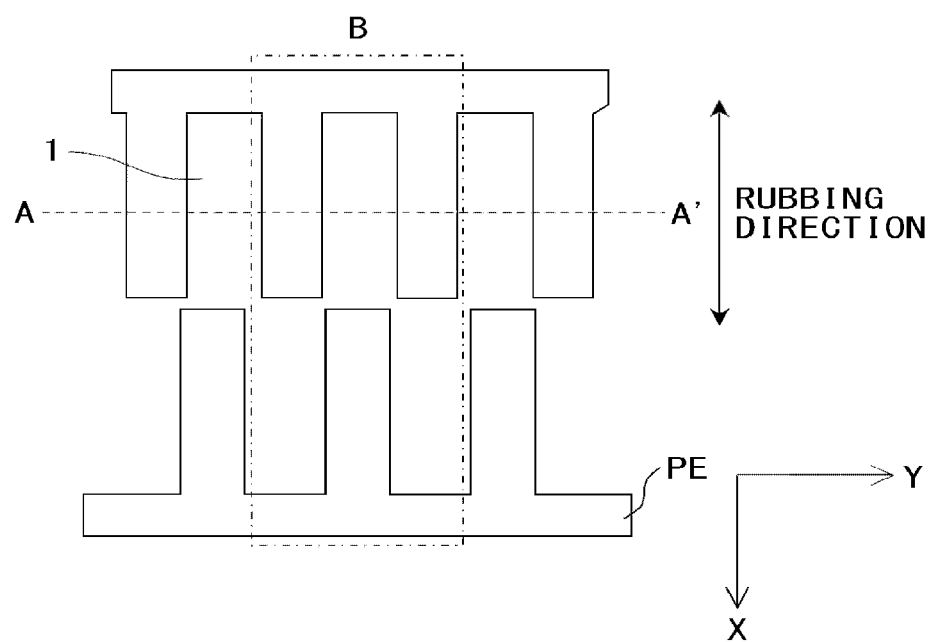
FIG. 3B is a plan view of the electrode structure.

FIGS. 3A and 3B are enlarged views of a region D in the electrode structure of FIG. 2. FIG. 3A is a sectional view of an A-A' line in FIG. 3B, and FIG. 3B is a plan view. The pixel electrode PE is disposed above the common electrode CE via an interlayer insulating film PCIL. A rubbing direction, which is a liquid crystal alignment direction, is parallel to the lengthwise direction of the striped electrode sections of the pixel electrode PE. The pair of upper and lower striped electrode sections are formed to be shifted in position from each other by substantially half a pitch in FIG. 3B. A line connecting a distal end of each upper striped electrode section is separate from a line connecting a distal end of each lower striped electrode section.

Figures 4A, 4B:
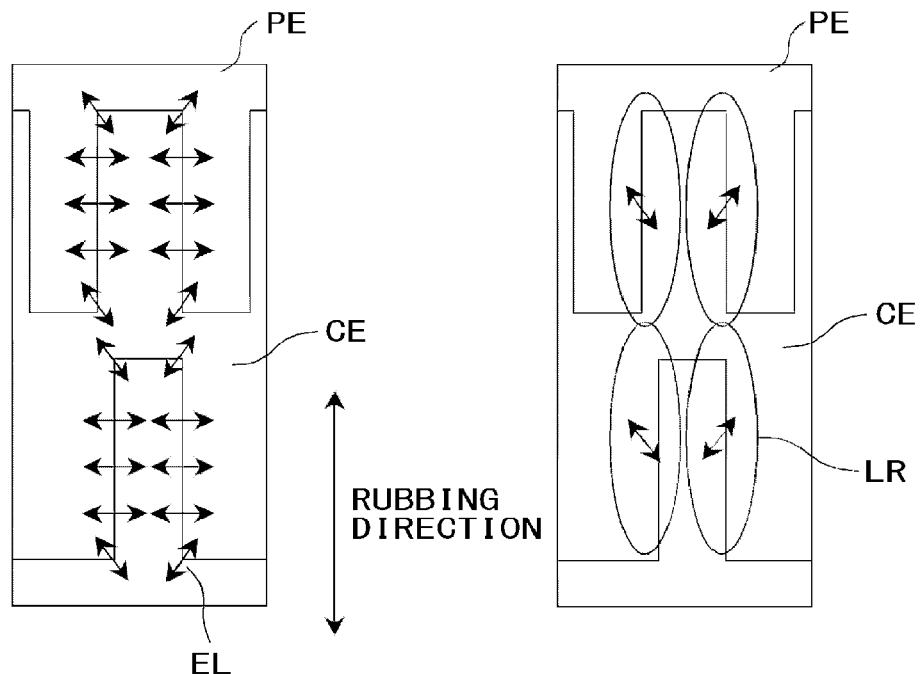
FIGS. 4A and 4B are explanatory diagrams illustrating the operation principle of the liquid crystal display device according to the comparative example.

FIGS. 4A and 4B are explanatory diagrams illustrating the way the liquid crystal display device according to the comparative example operates. FIGS. 4A and 4B are drawings showing only a region B of FIG. 3B. FIG. 4A shows directions of an electric field, and FIG. 4B shows rotational directions of the liquid crystals. The rubbing direction, or the alignment direction of the liquid crystals, is parallel to the lengthwise direction of the striped electrode sections of the pixel electrode PE, and the liquid crystal is made of a material that has a positive dielectric anisotropy. Thus, the liquid crystals between the striped electrode sections have equal force for clockwise and counterclockwise rotation, so that the respective rotational directions are not determinate. As indicated by the direction EL of the electric field in FIG. 4A, therefore, the electric field at edges or bases of the striped electrode sections is rendered oblique with respect to the electrode. As indicated by the rotational direction LR of the liquid crystals in FIG. 4B, the directions in which the liquid crystals rotate are determined based on the oblique field. Thus, the liquid crystals rotate in two different directions between the striped electrodes. At this time, regions in which the liquid crystals rotate in the same direction become small, compared with those of the conventional IPS-Pro or FFS schemes, and consequently, the aligned liquid crystals are significantly distorted, increase in resilience, and can be driven at a higher speed.

Figure 5:
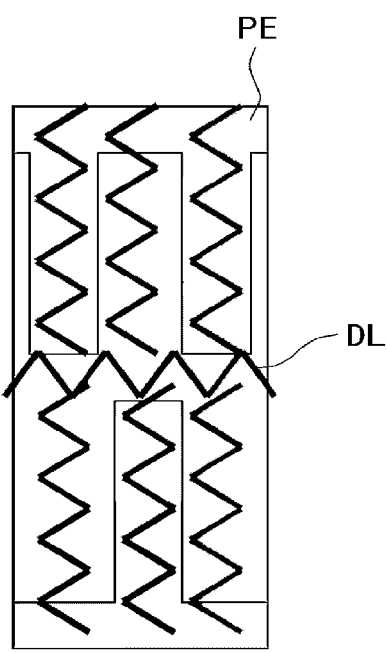
FIG. 5 is an explanatory diagram illustrating how the liquid crystal display device according to the comparative example reduces transmittance.

FIG. 5 is an explanatory drawing that illustrates how the liquid crystal display device according to the comparative example reduces transmittance. In a case that the liquid crystals differ in rotational direction, disclinations occur at the boundaries. In the electrode structure based on the IPS-Pro technology whose adoption was considered prior to the present disclosure, disclination lines DL, denote generation of black lines, ought to occur during voltage application, as shown in FIG. 5. Sufficient transmittance cannot be obtained at where the disclination lines DL occur.

The liquid crystal display device according to the comparative example, therefore, poses a problem that while fast response can be obtained, transmittance is low.

To deal with the above problem, the structure of the pixel electrode was studied. A liquid crystal display device according to an embodiment includes a common electrode having a structure of a flat shape, and a pixel electrode. The pixel electrode includes one pair of striped electrodes. A first striped electrode includes a short electrode section and long electrode sections, and a second striped electrode also includes a short electrode section and long electrode sections. The long electrode sections of the first striped electrode is disposed adjacently to those of the second striped electrode. Liquid crystals are initially oriented in a lengthwise direction of the striped electrodes. The liquid crystal display device according to the embodiment has fast response characteristics, and yet the device can raise transmittance. Hereunder, the embodiment will be described in detail using an example.

(Example)

As described above, the pixel electrode shape and liquid crystal alignment direction of the liquid crystal display device according to the example differ from those of the liquid crystal display device, shown in FIG. 1. In terms of other structural aspects, however, the liquid crystal display device of the example is substantially the same as in FIG. 1.

Figure 6:
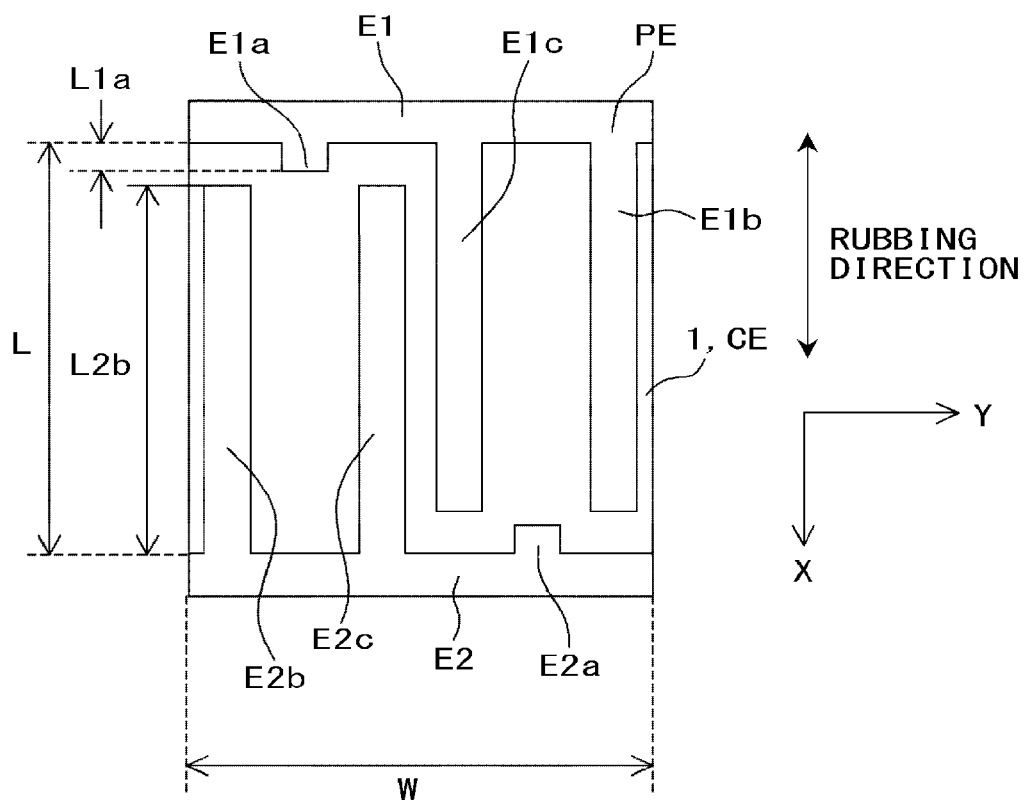
FIG. 6 is a diagram showing an electrode structure of a liquid crystal display device according to an example.

FIG. 6 is an external view showing an electrode structure of the liquid crystal display device according to the example. As shown in FIG. 6, although the pair of striped electrodes are disposed with a shift in position of half a pitch, the short electrode sections and the long electrode sections are combined to shift a position of a slit. For left-right balancing, the pair of striped electrodes are preferably shifted in position from each other by exactly half a pitch, but do not always need to be shifted in position by exactly half a pitch. The first striped electrode includes a short electrode section and a pair of long electrode sections adjacent to the short electrode section. The second striped electrode also includes a short electrode section and a pair of long electrode sections adjacent to the short electrode section. It is vital that the long electrode sections of the first striped electrode be adjacent to those of the second striped electrode, and that the slit extending in an X-direction be divided. The planar structure of the pixel electrode PE is described in further detail below.

The first striped electrode includes a short electrode section E1$a$ and long electrode sections E1$b$ and E1$c$ each extending in the X-direction, and an electrode section E1 that couples the electrode sections E1$a$, E1$b$, E1$c$ at one end of each and extends in a Y-direction. The second striped electrode includes a short electrode section E2$a$ and long electrode sections E2$b$ and E2$c$ each extending in the X-direction, and an electrode section E2 that couples the electrode sections E2$a$, E2$b$, E2$c$ at one end of each and extends in the Y-direction. These short and long electrodes E1$a$, E1$b$, E1$c$, E2$a$, E2$b$, and E2$c$ are each of a rectangular shape, and are placed between the electrode sections E1 and E2. The other end (distal end) of each of the short electrode section E1$a$ and the long electrode sections E1$b$, E1$c$ faces the electrode section E2, and the other end (distal end) of each of the short electrode section E2$a$ and the long electrode sections E2$b$, E2$c$ faces the electrode section E1. The electrode section E1 and the electrode section E2 are disposed at alternate positions. The distal end of the short electrode section E1$a$ faces the electrode section E2 between the adjacent long electrode sections E2$b$ and E2$c$. The distal end of the short electrode section E2$a$ faces the electrode section E1 between the adjacent long electrode sections E1$b$ and E1$c$.

If a distance between the electrode sections E1 and E2 is taken as L, length of the short electrode section E1$a$ as L1$a$, length of the long electrode section E2$b$ as L2$b$, and length of the long electrode section E2$c$ as L2$c$, then it follows that $$L2b > L/2 > L1a, L > L1a + L2b, \text{ and}$$

$$L2c > L/2 > L1a, L > L1a + L2c,$$

where L2$b$=L2$c$ may hold. If length of the short electrode section E2$a$ is taken as L2$a$, length of the long electrode section E1$b$ as L1$b$, and length of the long electrode section E1$c$ as L1$c$, then it follows that $$L1b > L/2 > L2a, L > L1b + L2a, \text{ and}$$

$$L1c > L/2 > L2a, L > L1c + L2a,$$

where L1$b$=L1$c$ may hold. Additionally or alternatively, L1$a$=L2$a$, L1$b$=L1$c$=L2$b$=L2$c$ may hold. The pixel electrode PE is formed in an iterative pattern with W of FIG. 6 as a period.

The pixel electrode PE of the rectangular shape has a slit to constitute the pair of striped electrodes, as in the comparative example. The short electrode section E1$a$, the long electrode sections E1$b$, E1$c$, the short electrode section E2$a$, and the long electrode sections E2$b$, E2$c$ need only to extend in the same direction and do not always need to extend exactly in the X-direction.

With the pixel electrode structure according to the example, the occurrence of a reverse domain that has been observed in the comparative example can be suppressed and transmittance can be improved. The reverse domain is a region in which the rotational direction of the liquid crystals during voltage application is reverse to that of the liquid crystals in a central portion of pixels. If the reverse domain occurs, an alignment change that causes clockwise rotation becomes balanced with an alignment change that causes counterclockwise rotation, and consequently a region in which no alignment change occurs is generated in the pixel. The region where no alignment change occurs indicates substantially the same alignment state as that of dark display, so the region is observed as disclinations or dark lines, which reduce transmittance. Forming long electrodes adjacent to one short electrode offers an advantageous effect.

Except for shape, the striped electrode sections of the pixel electrode PE are substantially the same as those of the structure in the comparative example. More specifically, except for shape, the striped electrode sections in FIGS. 2, 3A, 3B are substantially of the same pixel structure as in the example. A rubbing direction, or the direction in which the liquid crystals are aligned, is parallel to a lengthwise direction of the striped electrode sections of the pixel electrode PE, as in the comparative example. The striped electrode sections of the pixel electrode PE are formed so that the lengthwise direction (X-direction) of each is parallel to the X-direction in which a gate line GL extends. The lengthwise direction (X-direction) of each striped electrode section of the pixel electrode PE, however, needs only to be parallel to each other and does not always need to be parallel to the X-direction in which the gate line GL extends.

Figure 7:
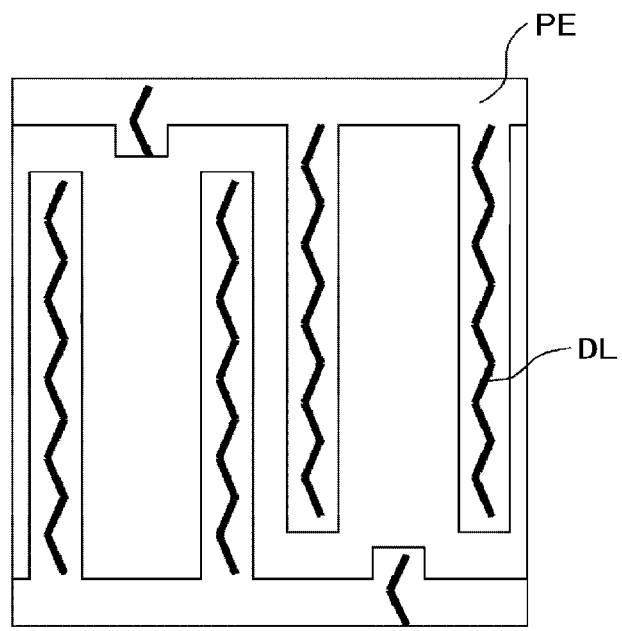
FIG. 7 is a diagram that shows places where a disclination occurs in the electrode structure of the liquid crystal display device according to the example.

FIG. 7 is a drawing that shows places in which a disclination occurs, in the electrode structure of the liquid crystal display device according to the example. As can be seen by comparing FIGS. 7 and 5, the number of places where the disclination occurs is reduced in the example. Thus, transmittance can be raised.

Figure 8A:
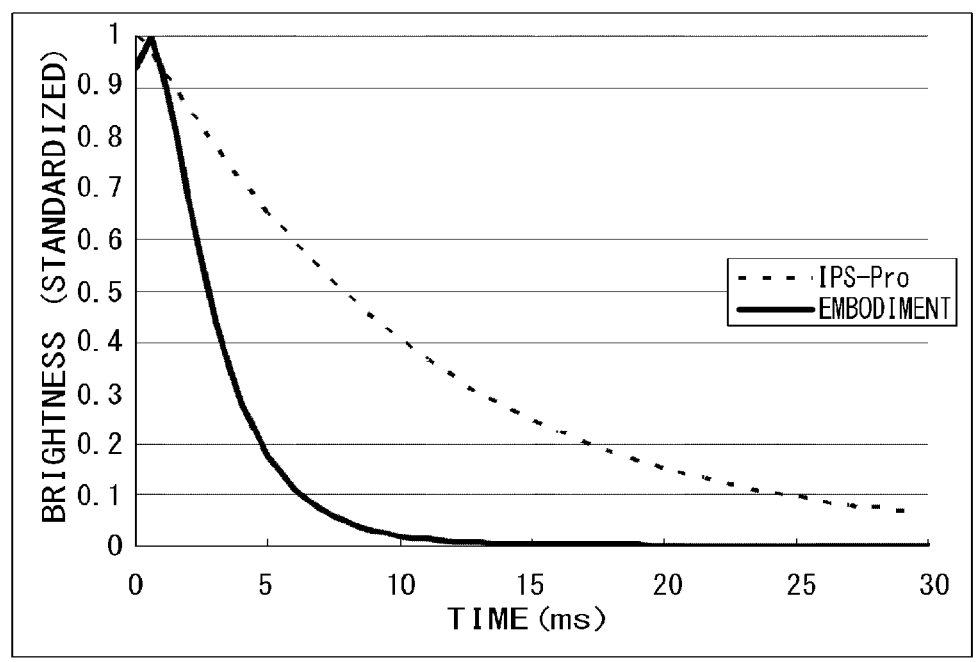
FIGS. 8A and 8B are diagrams that show measurement results on voltage-luminance characteristics of the electrode structure of the liquid crystal display device according to the comparative example, and those of the electrode structure of the liquid crystal display device according to the example.
Figure 8B:
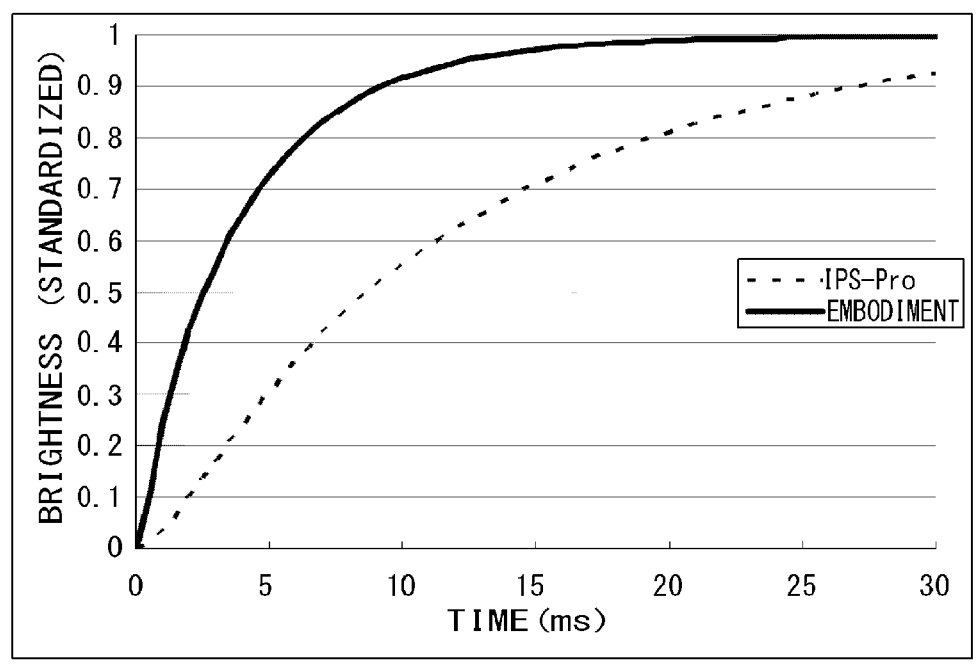

FIGS. 8A and 8B are diagrams that show simulation results on electro-optic response of the conventional liquid crystal display device of the IPS-Pro scheme and the liquid crystal display device according to the example. Both devices are made from liquid crystal materials having the same physical properties. FIG. 8A shows a fall time up to turn-off of the device, and FIG. 8B shows a rise time up to turn-on of the device. As is evident from the simulation results, the electrode structure of the example provides rapid driving of the liquid crystals. More specifically, as shown in FIG. 8A, the conventional IPS-Pro scheme (shown as IPS-Pro in FIGS. 8A and 8B) requires a fall time of about 25 msec at a 100%-10% response signal level, whereas the example requires only a fall time of about 6 msec at the same response signal level as the above. This means that the example implements more rapid driving than the conventional IPS-Pro scheme does. It can also be seen from FIG. 8B that at a 0%-90% response signal level, whereas the conventional IPS-Pro scheme requires a rise time of about 26 msec, the example requires only a rise time of about 10 msec, which means that the example implements more rapid driving than the conventional IPS-Pro scheme does. As in FIG. 4B, the liquid crystals rotate in two different directions between the striped electrodes. Thus, regions in which the liquid crystals rotate in the same direction become small, compared with those of the conventional IPS-Pro or FFS schemes, and consequently, the aligned liquid crystals are significantly distorted, increase in resilience, and can be driven at a higher speed.

Figure 9:
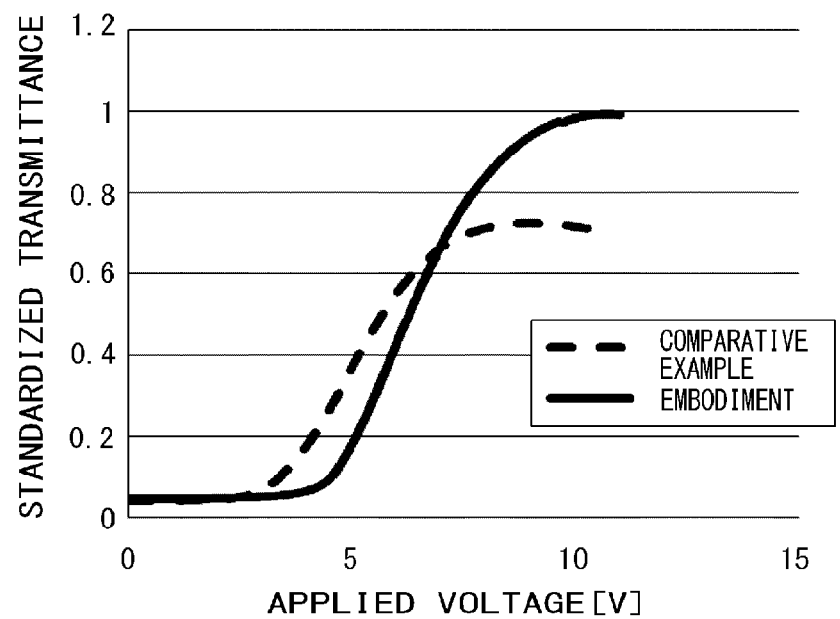
FIG. 9 is a diagram that shows simulation results on electro-optic response of a conventional liquid crystal display device of the IPS-Pro scheme and the liquid crystal display device according to the example.

FIG. 9 is a drawing that shows measurement results on voltage-luminance characteristics of a cell with the electrode structure of the liquid crystal display device according to the comparative example, and a cell with the electrode structure of the liquid crystal display device according to the example. FIG. 9 indicates that the electrode structure of the liquid crystal display device according to the example improves luminance.

In the liquid crystal display device according to the example, as in the comparative example, rapid driving can be realized since the rotational directions of the liquid crystals become opposite at both sides of the slit in the striped electrodes of the pixel electrode. In other words, rapid driving can be realized since the rotational directions of the liquid crystals become opposite at both sides of the slit in the striped electrodes of the pixel electrode. In addition, the occurrence of a reverse domain in the comparative example can be suppressed in the example of the present invention and transmittance can be improved.

Since the liquid crystal display device according to the example can respond rapidly, the display device can be applied as a vehicle-mounted liquid crystal display device. Additionally, since video performance improves, the display device can be applied as a liquid crystal display device for a smartphone or tablet terminal.

(First Modification)

Figure 10:
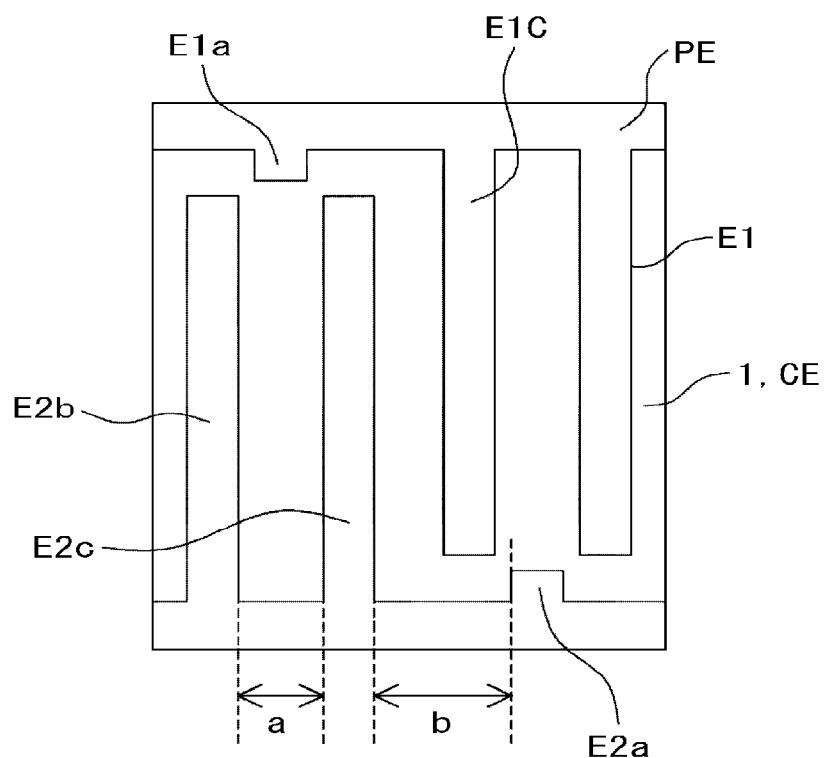
FIG. 10 is a diagram showing an electrode structure of a liquid crystal display device according to a first modification.

FIG. 10 is a drawing showing an electrode structure of a liquid crystal display device according to a first modification. As shown in FIG. 10, if a spacing between the long electrode sections E2$b$ and E2$c$ and a spacing between the long electrode sections E1$b$ and E1$c$ are both taken as "a", and a spacing between the short electrode section E2$a$ and the long electrode section E2$c$ and a spacing between the short electrode section E1$a$ and the long electrode section E1$c$ are both taken as "b", then "a<b" holds in the pixel electrode structure of the liquid crystal display device according to the first modification. In the pixel electrode structure of the liquid crystal display device according to the example, "a≥b" holds. Other pixel-electrode structural aspects are the same as those of the example. In the example, the occurrence of disclinations has been observed between a short electrode section and long electrode sections. In the first modification, however, occurrence of disclinations can be suppressed since the distal end of the short electrode section E2$a$ can be brought close to those of the long electrode sections E1$b$ and E1$c$ and since the distal end of the short electrode section E1$a$ can be brought close to those of the long electrode sections E2$b$ and E2$c$. The pixel electrode structure of the liquid crystal display device according to the first modification will therefore provide higher transmittance than the pixel electrode structure of the liquid crystal display device according to the example. A spacing between the long electrode section E1$c$ and the long electrode section E2$c$ is greater than in the example.

(Second Modification)

Figure 11:
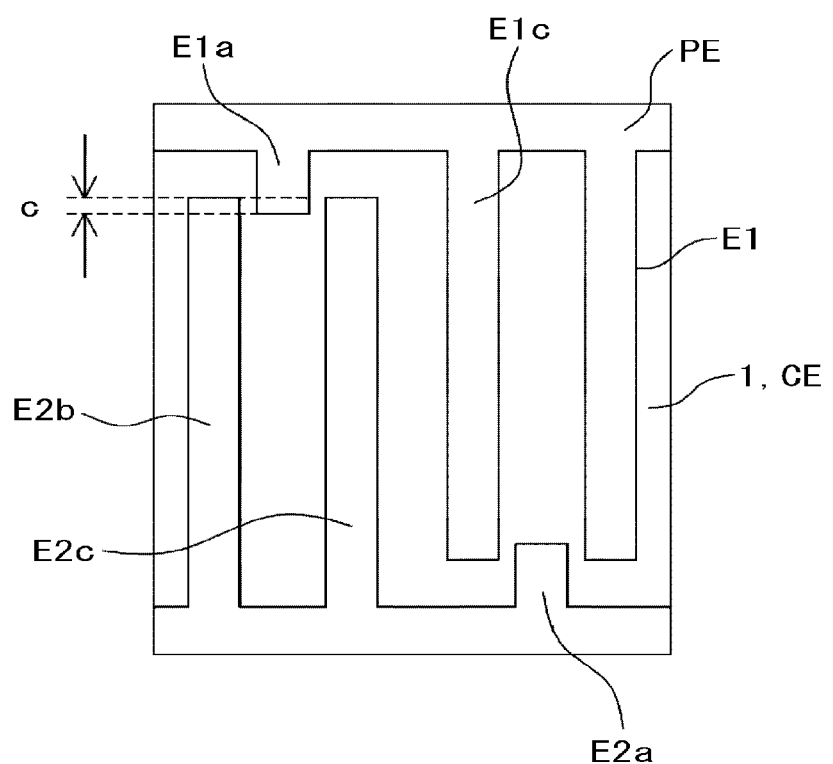
FIG. 11 is a diagram showing an electrode structure of a liquid crystal display device according to a second modification.

FIG. 11 is a drawing showing a pixel electrode structure of, and directions of an electric field in, a liquid crystal display device according to a second modification. The pixel electrode structure of the liquid crystal display device according to the second modification differs from the structure of the first modification in FIG. 10 in that as shown in FIG. 11, short electrode sections are nested between long electrode sections. Other pixel-electrode structural aspects are the same as those of the first modification. The short electrode section E1$a$ is nested between the long electrode sections E2$b$ and E2$c$, and the short electrode section E2$a$ is nested between the long electrode sections E1$b$ and E1$c$. The nested structure makes liquid crystals move more smoothly. Thus the occurrence of disclinations that has been observed in the slit can be suppressed and transmittance can be improved. An advantageous effect can be obtained if nesting length C exceeds or equal to 0. The pixel electrode structure of the liquid crystal display device according to the second modification will therefore provide higher transmittance than the pixel electrode structures of the liquid crystal display devices according to the example and the first modification. Relationships of L=L1$a$+L2$b$−C, L=L1$a$+L2$c$−C, L=L1$b$+L2$a$−C, L=L1$c$+L2$a$−C are established in the second modification. In addition, the long electrode section E1$c$ is nested between the short electrode section E2$a$ and the long electrode section E2$c$, and the long electrode section E2$c$ is nested between short electrode section E1$a$ and the long electrode section E1$c$.

While the invention achieved by the present inventors has been described in detail above on the basis of the embodiment, the example, and the modifications, it goes without saying that the invention is not limited to the embodiment, the example, and the modifications, and may be changed or modified in various forms.

What is claimed is:
1. A liquid crystal display device, comprising:
a common electrode having a flat structure;
a pixel electrode disposed above the common electrode via an insulating film;
an alignment film disposed on the pixel electrode; and
a liquid crystal layer disposed on the alignment film, wherein
the pixel electrode includes one pair of striped electrodes,
a first striped electrode of the striped electrodes pair includes a short electrode section,
a second striped electrode of the striped electrodes pair includes a plurality of long electrode sections, the short electrode section belonging to the first striped electrode is disposed at an opposed position with respect to the long electrode sections belonging to the second striped electrode, the short electrode sections of the first striped electrodes are shorter than the long electrode sections of the second striped electrodes, and liquid crystals are aligned in a lengthwise direction of the striped electrodes.

2. The liquid crystal display device according to claim 1, wherein the pixel electrode has a slit to constitute the pair of striped electrodes.

3. The liquid crystal display device according to claim 1, wherein the pixel electrode includes a contact hole in a place different from where the slit is located, the common electrode includes a hole, and the hole is close to the contact hole.

4. The liquid crystal display device according to claim 1, further comprising a gate line, wherein the lengthwise direction of the striped electrodes is parallel to a direction in which the gate line extends.

5. The liquid crystal display device according to claim 1, further comprising a source line, wherein the lengthwise direction of the striped electrodes is orthogonal to a direction in which the source line extends.

6. The liquid crystal display device according to claim 1, wherein the liquid crystal layer is made from a material that has a positive dielectric anisotropy.

7. The liquid crystal display device according to claim 1, wherein, of the first striped electrode, a distance between the adjacent two long electrode sections is shorter than a distance between the adjacent long and short electrode sections.

8. The liquid crystal display device according to claim 7, wherein the short electrode section belonging to the first striped electrode is nested between the adjacent long electrode sections belonging to the second striped electrode.

9. A liquid crystal display device, comprising:

a common electrode having a flat structure;

a pixel electrode disposed above the common electrode via an insulating film;

an alignment film disposed on the pixel electrode; and a liquid crystal layer disposed on the alignment film, wherein the pixel electrode includes a first striped electrode and a second striped electrode, the first striped electrode includes a first electrode section extending in a first direction, and a first short electrode section extending from the first electrode section to a second direction crossing the first direction, the second striped electrode includes a second electrode section extending in a first direction, and a fifth long electrode section, and a sixth long electrode section, each extending from the second electrode section to the second direction, the first short electrode section has a distal end disposed at an opposed position with respect to the second electrode section between the second long electrode section and the third long electrode section, the first short electrode section is shorter than, the second long electrode section, and the third long electrode section, and liquid crystals are aligned in the second direction.

10. The liquid crystal display device according to claim 9, wherein the first direction and the second direction are orthogonal to each other.

11. The liquid crystal display device according to claim 9, wherein the pixel electrode has a slit to constitute the first striped electrode and the second striped electrode.

12. The liquid crystal display device according to claim 9, wherein the pixel electrode includes a contact hole in a place different from where the slit is located, the common electrode includes a hole, and the hole is close to the contact hole.

13. The liquid crystal display device according to claim 9, further comprising a gate line extended in the first direction.

14. The liquid crystal display device according to claim 9, further comprising a source line extended in the second direction.

15. The liquid crystal display device according to claim 9, wherein the liquid crystal layer is made from a material that has a positive dielectric anisotropy.

* * * * *